United States Patent
Griesmer et al.

(10) Patent No.: US 12,167,314 B2
(45) Date of Patent: *Dec. 10, 2024

(54) FACILITATION OF LOCAL DISASTER MOBILE EDGE COMPUTING RESILIENCY FOR 5G OR OTHER NEXT GENERATION NETWORK

(71) Applicant: AT&T Intellectual Property I, L.P., Atlanta, GA (US)

(72) Inventors: Stephen Griesmer, Westfield, NJ (US); Nathan Grube, Trophy Club, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,948

(22) Filed: Nov. 2, 2022

(65) Prior Publication Data

US 2023/0086745 A1  Mar. 23, 2023

Related U.S. Application Data

(63) Continuation of application No. 17/222,818, filed on Apr. 5, 2021, now Pat. No. 11,528,588.

(51) Int. Cl.
| | |
|---|---|
| *H04W 4/90* | (2018.01) |
| *G08B 25/00* | (2006.01) |
| *H04W 12/02* | (2009.01) |
| *H04W 40/02* | (2009.01) |
| *H04W 40/20* | (2009.01) |
| *H04W 72/566* | (2023.01) |

(52) U.S. Cl.
CPC ............ *H04W 4/90* (2018.02); *G08B 25/006* (2013.01); *H04W 12/02* (2013.01); *H04W 40/023* (2013.01); *H04W 40/20* (2013.01); *H04W 72/569* (2023.01)

(58) Field of Classification Search
CPC ..... H04W 4/90; H04W 12/02; H04W 40/023; H04W 40/20; H04W 721/1242; G08B 25/006
USPC ........................................................ 455/404.1
See application file for complete search history.

(56) References Cited

U.S. PATENT DOCUMENTS

| | | | |
|---|---|---|---|
| 8,553,854 B1 | 10/2013 | Weaver et al. | |
| 9,037,108 B1 | 5/2015 | Delatorre | |
| 9,374,536 B1 * | 6/2016 | Nola | ...................... H04N 7/141 |

(Continued)

OTHER PUBLICATIONS

Non Final Office Action received for U.S. Appl. No. 17/222,818 dated Apr. 11, 2022, 23 pages.

*Primary Examiner* — Maria El-Zoobi
(74) *Attorney, Agent, or Firm* — Guntin & Gust, PLC; Andrew Gust

(57) ABSTRACT

Local weather information such as a nationwide emergency network for first responders can enable first responders to communicate nationally with a single network, linking to suppliers, utilities, and weather information. The system disclosed herein can provide data to first responders and data from first responders can provide insights into local conditions that can be utilized by edge data centers. Adding first responder data can improve the processing speed of moving of edge-based applications out of threatened data centers. Because this movement can also have an impact on low latency applications, identifying the closest edge sites without an impact can keep the applications operating.

20 Claims, 10 Drawing Sheets

(56) References Cited

U.S. PATENT DOCUMENTS

| | | | | |
|---|---|---|---|---|
| 9,443,518 B1* | 9/2016 | Gauci | | G06F 40/169 |
| 9,462,230 B1* | 10/2016 | Agrawal | | G06Q 50/20 |
| 9,525,830 B1* | 12/2016 | Roylance | | H04M 1/72478 |
| 9,843,676 B1* | 12/2017 | Pan | | H04W 4/12 |
| 10,582,343 B1* | 3/2020 | Patton | | H04W 4/90 |
| 2004/0190497 A1* | 9/2004 | Knox | | H04M 7/1285 |
| | | | | 370/352 |
| 2005/0075116 A1* | 4/2005 | Laird | | A61B 5/1117 |
| | | | | 455/414.1 |
| 2014/0179260 A1* | 6/2014 | Malin | | H04W 4/029 |
| | | | | 455/566 |
| 2016/0100023 A1* | 4/2016 | Kim | | H04L 67/56 |
| | | | | 709/227 |
| 2016/0379470 A1* | 12/2016 | Shurtz | | H04W 4/16 |
| | | | | 455/404.2 |
| 2021/0012282 A1* | 1/2021 | Smith | | H04L 9/50 |
| 2022/0027417 A1 | 1/2022 | Katz et al. | | |
| 2022/0103683 A1* | 3/2022 | Engelke | | H04M 3/42391 |

\* cited by examiner

FACILITATION OF LOCAL DISASTER MOBILE EDGE COMPUTING RESILIENCY FOR 5G OR OTHER NEXT GENERATION NETWORK

RELATED APPLICATION

The subject patent application is a continuation of, and claims priority to, U.S. patent application Ser. No. 17/222,818, filed Apr. 5, 2021, and entitled "FACILITATION OF LOCAL DISASTER MOBILE EDGE COMPUTING RESILIENCY FOR 5G OR OTHER NEXT GENERATION NETWORK," the entirety of which priority application is hereby incorporated by reference herein.

TECHNICAL FIELD

This disclosure relates generally to facilitating mobile edge computing services. For example, this disclosure relates to facilitating mobile edge computing resiliency during local disasters for a 5G, or other next generation network, air interface.

BACKGROUND $5^{th}$ generation (5G) wireless systems represent a major phase of mobile telecommunications standards beyond the current telecommunications standards of $4^{th}$ generation (4G). 5G networks can support higher capacity than current 4G networks, allowing a higher number of mobile broadband users per area unit, and allowing consumption of higher data quantities. For instance, this enables a large portion of the population to stream high-definition media many hours per day with their mobile devices, while out of reach of wireless fidelity hotspots. 5G technologies also provide improved support of machine-to-machine communication, also known as the Internet of things, enabling lower cost, lower battery consumption, and lower latency than 4G equipment.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
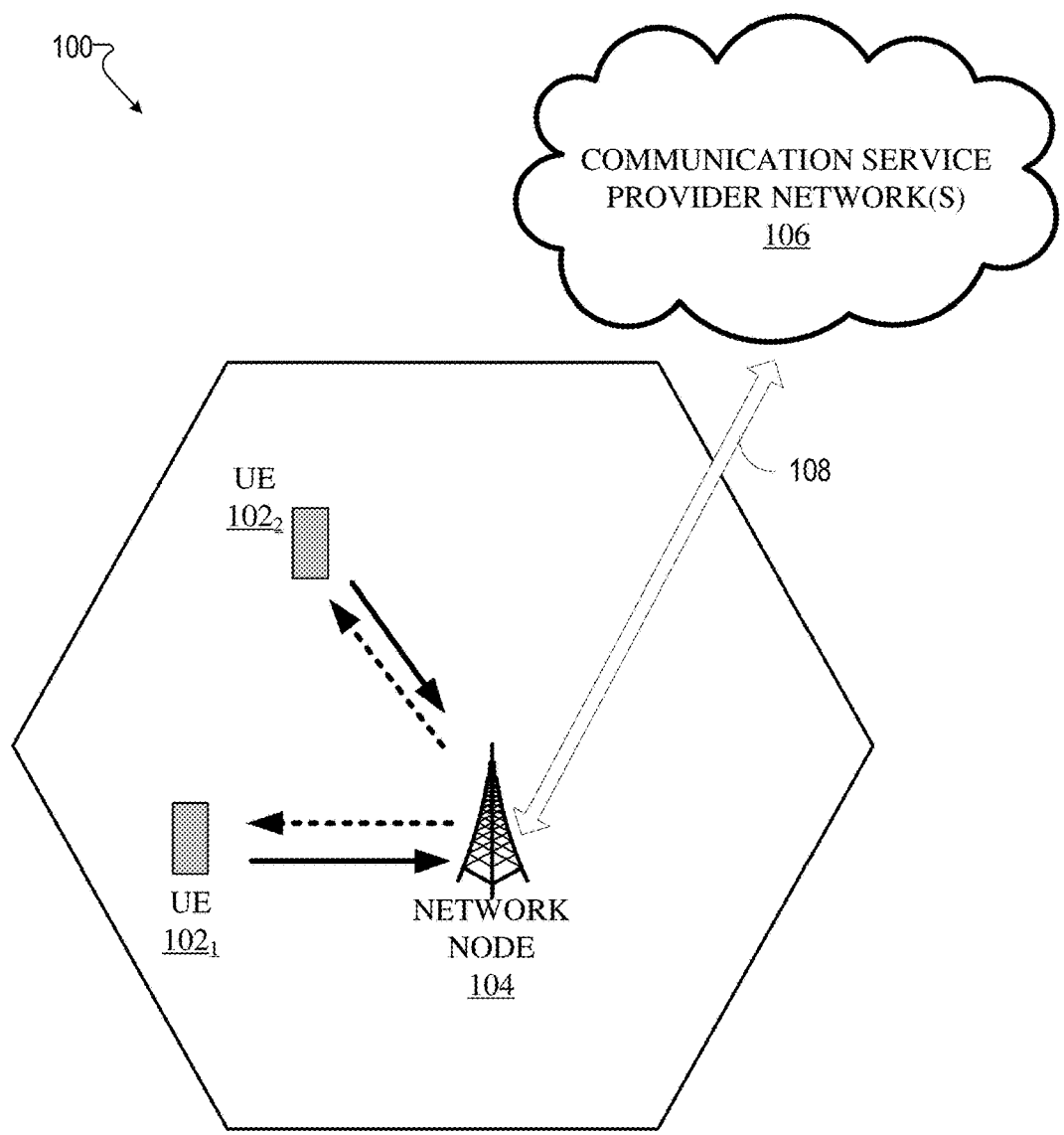
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, random access memory (RAM), read only memory (ROM), electrically erasable programmable read only memory (EEPROM), a magnetic storage device, e.g., hard disk; floppy disk; magnetic strip(s), magnetic cassettes, magnetic tapes; an optical disk (e.g., compact disk (CD), CD-ROM, a digital video (or versatile) disc (DVD), a Blu-ray Disc™ (BD) or other optical disk storage); a smart card; a flash memory device (e.g., card, stick, key drive); solid state drives or other solid state storage devices; and/or a virtual device that emulates a storage device, other tangible and/or non-transitory media which can be used to store specified information, and/or any other computer-readable media described herein.

As an overview, various embodiments are described herein to facilitate mobile edge computing resiliency during local disasters for a 5G air interface or air interface for other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, or other next generation networks, the disclosed aspects are not limited to 5G, and/or other next generation network implementations, as the techniques can also be applied in existing technologies, such as 3G, or 4G systems. For example, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

As mentioned, described herein are systems, methods, articles of manufacture, and other embodiments or implementations that can facilitate mobile edge computing resiliency during local disasters for a 5G network. Facilitating mobile edge computing resiliency during local disasters for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of a UE are a target device, a device to device (D2D) UE, a machine type UE, a UE capable of machine to machine (M2M) communication, personal digital assistant (PDA), a Tablet or tablet computer, a mobile terminal, a smart phone, an IOT device, a laptop or laptop computer, a laptop having laptop embedded equipment (LEE, such as a mobile broadband adapter), laptop mounted equipment (LME), a universal serial bus (USB) dongle enabled for mobile communications, a computer having mobile capabilities, a mobile broadband adapter, a wearable device, a virtual reality (VR) device, a heads-up display (HUD) device, a smart vehicle (e.g., smart car), a machine-type communication (MTC) device, etc. A UE can have one or more antenna panels having vertical and horizontal elements. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In some embodiments, the non-limiting term radio network node, or simply network node, is used. It can refer to any type of network node that serves a UE or network equipment connected to other network nodes, network elements, or any radio node from where a UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second offered simultaneously or concurrently to tens of workers on the same office floor; several hundreds of thousands of simultaneous or concurrent connections for massive sensor deployments; enhanced spectral efficiency compared to 4G or LTE; improved coverage compared to 4G or LTE; enhanced signaling efficiency compared to 4G or LTE; and reduced latency compared to 4G or LTE. In multicarrier systems, such as OFDM, each subcarrier can occupy bandwidth (e.g., subcarrier spacing). If carriers use the same bandwidth spacing, then the bandwidth spacing can be considered a single numerology. However, if the carriers occupy different bandwidth and/or spacing, then the bandwidth spacing can be considered a multiple numerology.

Localized information on weather conditions from first responders can be used to gather data while the first responders are tending to the medical and safety needs of the local population. The information can include postings on web sites, texts, phone calls, and local news as well as the volume of calls. This is similar to the Google predicting flu activity based on search queries. This information can then be shared with the provider of the 5G mobility services to move applications out of the local edge data center. The move can occur through machine learning algorithms or manually through human intervention. Privacy concerns can be allayed by anonymizing the data from the identity of the responders. They can also be alleviated by sharing information with government agencies to enable better planning for disasters. The same information flow can also signal that additional instances or types of applications can be added to a local site to handle an increase in demand.

If a data center is going to be without power (e.g., if there is a hurricane approaching), then artificial intelligence (AI) can proactively failover in advance of the situation to minimize impact to users. Network service providers have access to their subscriber IDs, what types of devices they are using, emergency services facilitated and additional information provided to the subscribers during a disaster. However, with regards to providing emergency services, situations perceived by emergency services devices can be utilized to predict certain behaviors. For example, knowing where first responders are can provide data on what situation is occurring and thus provide guidance on when to move applications (e.g., applications that control devices that are nearby such as drones, autonomous vehicles, and/or other devices in a local area network that are in proximity to antennas that are utilized to provide signals associated with the applications) away from that area to alternative sites that are not impacted. Proactive virtual movement of facilities can occur when applications can be proactively shut down and moved to another edge compute node that is close enough to not incur latency but far enough away such that it is outside of the disaster zone itself.

A software defined networking multi-layer controller (SDN MLC) is a controller that optimizes the backbone where the network can utilize protocols to failover. It should be understood that other controllers can "rehome" virtual network functions as well, and that this disclosure is not limited to just SDN MLCs. However, assuming virtualization of edge computing (e.g., the ability to reallocate resources without moving physical boxes), another controller can sit on top and determine a better way to reconfigure the network, control edge locations, and move services around based on information gathered in the network or from new sources or other areas. Consequently, the AI can be used to optimized the network and/or the edge locations in a similar manner to the SDN MLC.

Various types of data can be gathered from emergency (e.g., FirstNet) responders. The same type data that can be gathered from regular mobile customers can be gather from emergency responder devices. For example, types of data can include but are not limited to: text messages, websites, domain name system (DNS) data, call data, and/or news sites that can be used. It should be noted that regular mobile device data can be used in addition to the emergency services device data to determine what regular users are concerned with. The data received from the emergency responder and/or regular user devices can then be anonymized and then aggregated. The data can be anonymized by scrubbing the data to remove any personal identification of the data being received. For example, the ID can be rewritten to be generic. Phone numbers and payment card industry (PCI) data (e.g., social security data, personal data, or the like) can be rewritten as scrambled user numbers. Rather than aggregating all data, the data can be sampled to create a threshold for aggregation. Thus, data can be aggregated up to the threshold prior to the aggregated data being sent to the edge controller device. The aggregation can be performed on keywords in text messages and/or with location data to assess impact across a geographic region. In another example, a first responder ability can be used to connect as a map to identify high impact regions in a disaster event.

Once the data is aggregated and anonymized, the data can be processed to generate predictions based on the data. For example, if there a high probability that is a storm will occur or is in progress, then logic can be executed at the edge controller to move processing off an edge node to another edge node that will not potentially be impacted. Therefore, location and event data are utilized to make a judgement call on what data to move and where to move the data relative to where the disaster is occurring or is likely to occur. Additionally, characteristics of the edge location (e.g., location, capacity, distance from the affected location) can be used to feed into the determination of where to send the data. It should be noted that the processing can occur prior to the edge controller and/or at the edge controller.

According to another embodiment, a method can comprise receiving, from a user equipment by mobile edge computing equipment comprising a processor, emergency services data associated with an emergency situation. In response to receiving the emergency services data, the method can comprise anonymizing, by the mobile edge computing equipment, the emergency services data, resulting in anonymized emergency services data. Additionally, in response to anonymizing the emergency services data, the method can comprise aggregating, by the mobile edge computing equipment, the anonymized emergency services data, resulting in aggregated emergency services data. Furthermore, based on a first geography associated with the mobile edge computing equipment, in relation to a second geography associated with mobile edge controller equipment, the method can comprise sending, by the mobile edge computing equipment to the mobile edge controller equipment, the aggregated emergency services data.

According to another embodiment, a system can facilitate, receiving from a user equipment, emergency services data associated with an emergency situation. In response to receiving the emergency services data, the system can comprise anonymizing the emergency services data, resulting in anonymized emergency services data. Additionally, the system can comprise aggregating the anonymized emergency services data, resulting in aggregated emergency services data. Furthermore, based on a first location of mobile edge controller equipment in relation to a second location of the user equipment, the system can comprise sending, the aggregated emergency services data to the mobile edge controller equipment.

According to yet another embodiment, described herein is a machine-readable medium comprising executable instructions that, when executed, can perform the operations comprising receiving emergency services data representative of an impending emergency situation. The machine-readable medium can comprise executable instructions that, when executed, can perform the operations comprising anonymizing the emergency services data, resulting in anonymized emergency services data in response to receiving the emergency services data. The machine-readable medium can comprise aggregating the anonymized emergency services data, resulting in aggregated emergency services data, in response to anonymizing the emergency services data. Based on a first location of first mobile edge controller equipment in relation to a second location of second mobile edge controller equipment, the machine-readable medium can perform operations comprising sending the aggregated emergency services data to the second mobile edge controller equipment.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment (UE) can refer to any type of device that can communicate with a network node in a cellular or mobile communication system.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment, thus providing connectivity between the UE and the wider cellular network. The UE 102 can send transmission type recommendation data to the network node 104. The transmission type recommendation data can include a recommendation to transmit data via a closed loop multiple input multiple output (MIMO) mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks fulfill the demand of exponentially increasing data traffic and allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of LTE systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications.

The 5G access network may utilize higher frequencies (e.g., >6 GHz) to aid in increasing capacity. Currently, much of the millimeter wave (mmWave) spectrum, which is the band of spectrum between 30 gigahertz (GHz) and 300 GHz, is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of MIMO techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are being adopted for use in 5G systems.

Referring now to FIGS. 2-5, illustrated is an example schematic system block diagram of an edge processing component according to one or more embodiments.

Figure 2:
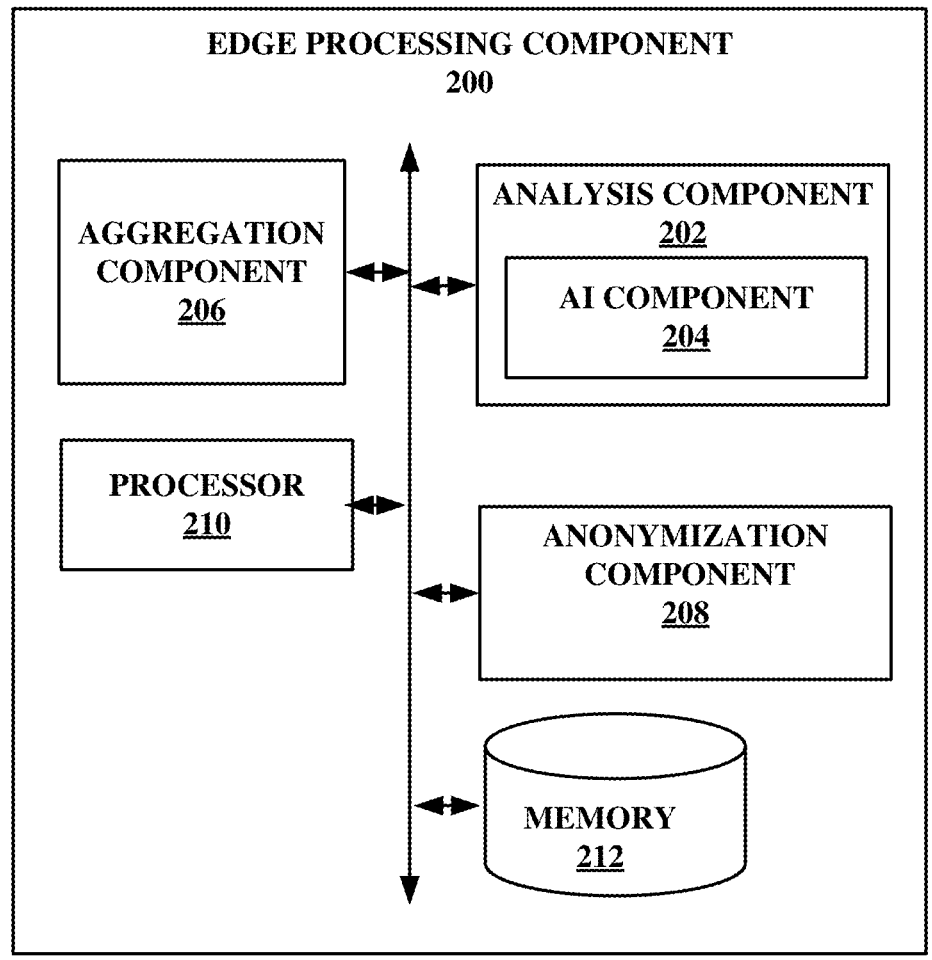
FIG. 2 illustrates an example schematic system block diagram of an edge processing component according to one or more embodiments.
Figure 3:
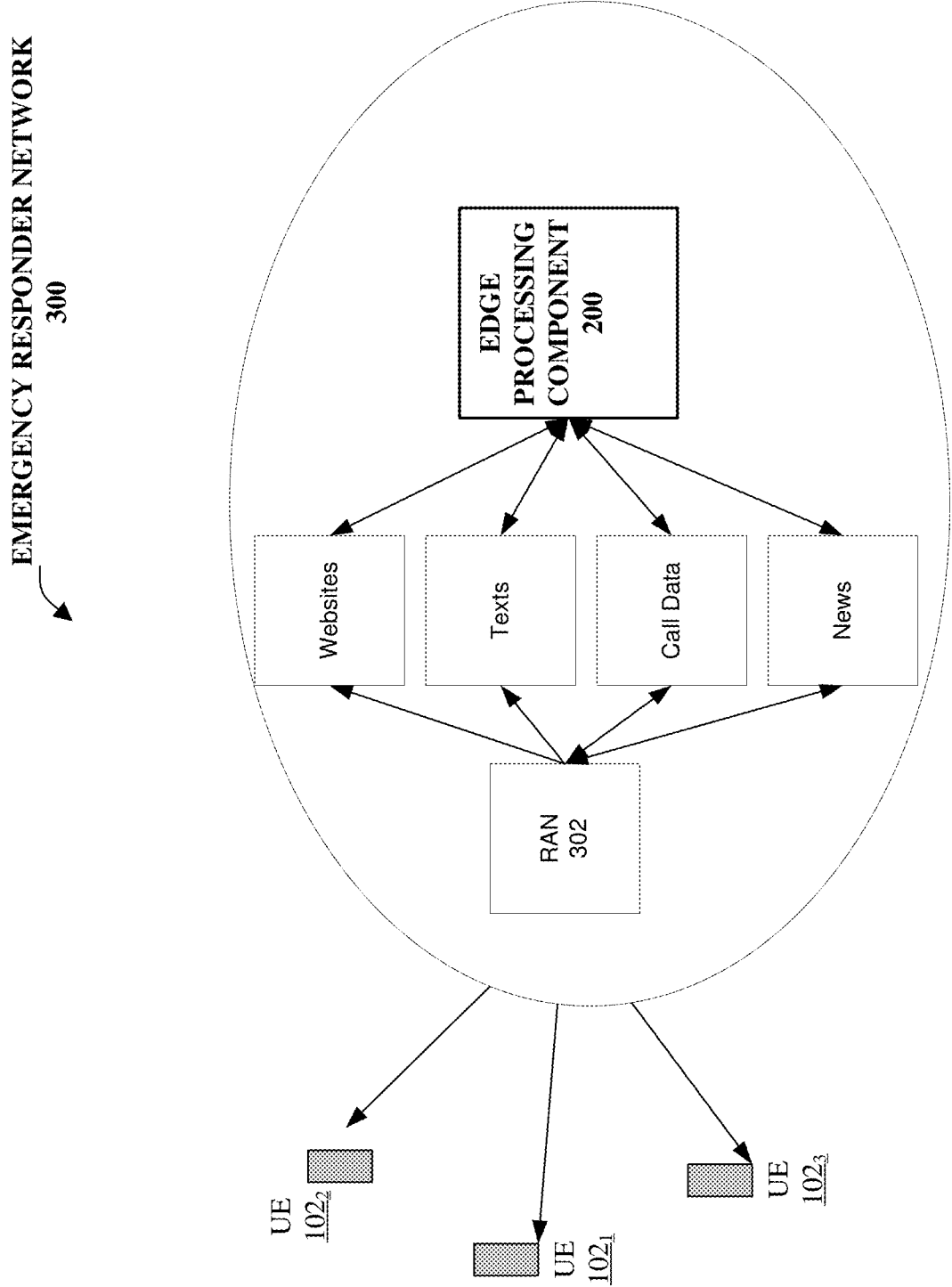
FIG. 3 illustrates an example schematic system block diagram of an emergency responder network according to one or more embodiments.
Figure 4:
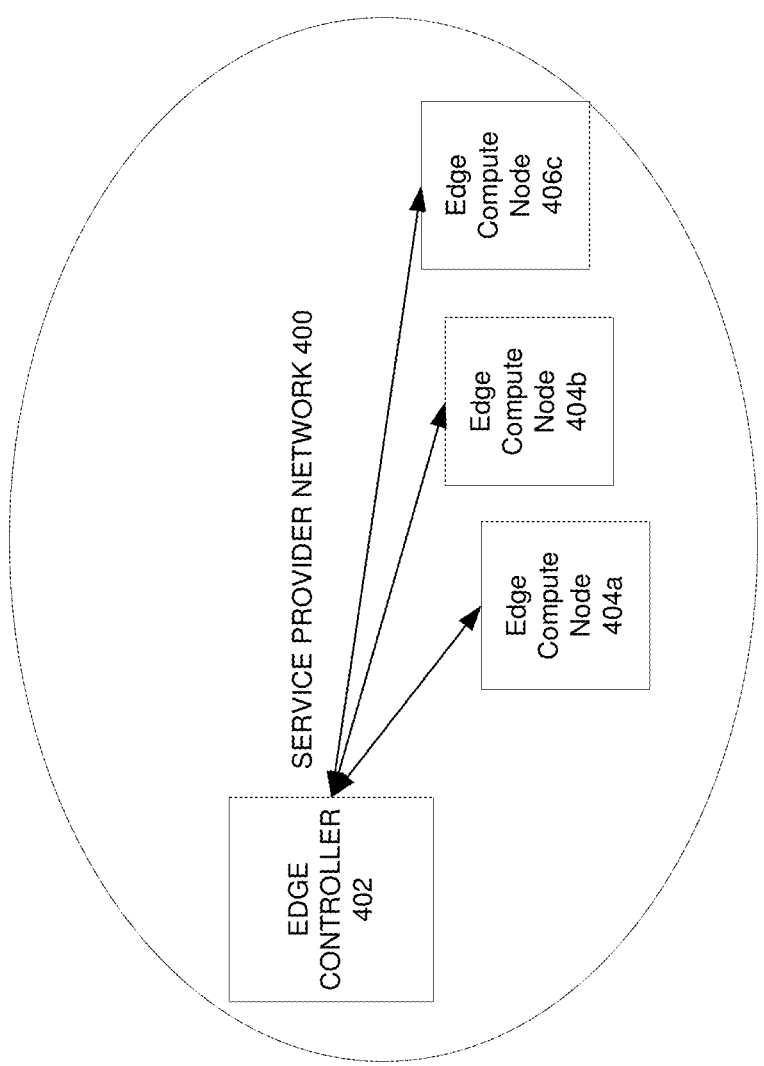
FIG. 4 illustrates an example schematic system block diagram of a service provider network according to one or more embodiments.
Figure 5:
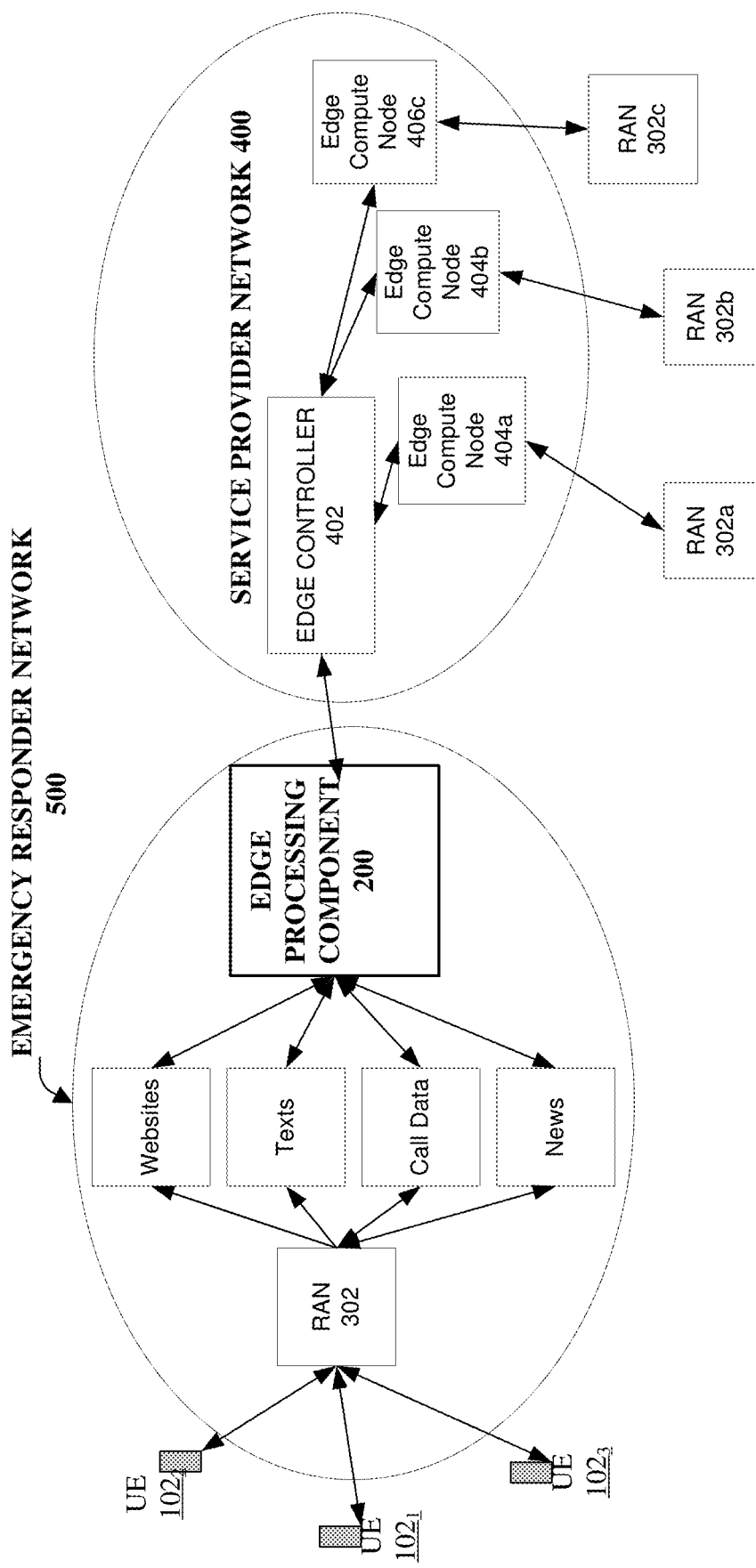
FIG. 5 illustrates an example schematic system block diagram of a system for facilitating local edge computing resiliency according to one or more embodiments.

In the embodiment shown in FIG. 2, an edge processing component 200 can comprise sub-components (e.g., analysis component 202, AI component 204, and an anonymization component 208), processor 210 and memory 212 can bi-directionally communicate with each other. It should also be noted that in alternative embodiments that other components including, but not limited to the sub-components, processor 210, and/or memory 212, can be external to the edge processing component 200. Aspects of the processor 210 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the edge processing component 200. In an aspect, the edge processing component 200 can also include memory 212 that stores computer executable components and instructions. With regards to this disclosure, it should be noted that certain virtualized components can also be located at different parts of the overall system as it relates to this disclosure. For example, the aggregation component 206 and the anonymization component 208 can be hosted within an emergency responder network, and the edge processing component 200 can be hosted at or before an edge controller as depicted in FIGS. 4 and 5.

Within an emergency responder network 300, the edge processing component 200 can receive UE $102_1$, $102_2$, $102_3$ data from a RAN 302 that has received the data from the UEs $102_1$, $102_2$, $102_3$ of first responders. The UE $102_1$, $102_2$, $102_3$ data can comprise various data types including, but not limited to, websites, texts, call data, news data, etc. Based on the type of data, timestamps, and/or locations of the UE $102_1$, $102_2$, $102_3$ that sent the data, the data can be aggregated by the aggregation component 206. For processing purposes, defined thresholds of how much data can be aggregated can be determined prior to the data aggregation process. Once the threshold has been satisfied, the aggregation process can terminate and/or the data can be further processed by another component. For example, after the threshold has been satisfied, the analysis component 202 and/or the anonymization component 208 can begin to process the aggregated data.

After the UE $102_1$, $102_2$, $102_3$ data is aggregated, it can be anonymized by the anonymization component 208 or analyzed by the analysis component 204 and then anonymized. The anonymization component 208 can strip the UE $102_1$, $102_2$, $102_3$ data of any type of identifying information (e.g., phone numbers, social security numbers, mobile application usernames, user identities, etc.). Thus, personal or sensitive data can be removed from the data that is passed through the system.

The analysis component 202 can be configured to receive the aggregated data that is based on the UE $102_1$, $102_2$, $102_3$ data perceived by the RAN 302. The analysis component 202 can analyze the data in light of network condition data, historical data, UE's activity patterns in terms of mobility and usage, and/or the like. The analysis component 202 can also be configured to receive pattern detection and model development data, from an external device, that has been previously trained. Consequently, the analysis component 202 can analyze the aforementioned data to predict outcomes associated with emergency situations and assign priority values therewith. For example, as it relates to moving of the applications, a higher priority value can be assigned to a predicted outcome for more severe events (e.g., hurricanes, tornadoes, fires). The priority value can then be used to determine how far an application should be moved virtually. For example, if a hurricane is predicted to affect a 200-mile radius, then the priority value can be assigned such that the system can identify and send the application to the closest edge compute node 404a, 404b, 404c that is outside of that 200-mile radius. The AI component 204 can then leverage current and previous analysis data to generate a prediction of the of the severity of an emergency and assign a priority value based on the prediction. This information can then be sent to an edge controller 402 (as depicted in FIG. 4) of a service provider network 400. The edge controller 402 can then send the application to respective edge compute nodes that can host the applications. The goal would be to remove the applications, from a geographic location that could be adversely affected by the emergency situation, to an edge compute node 404a, 404b, 404c that is close enough to the devices that can request the applications to prevent and/or reduce latency. Thus, the geographic location of the edge compute nodes 404a, 404b, 404c are considered by the edge controller, prior to the edge controller sending the applications to the edge compute nodes 404a, 404b, 404c.

Referring now to FIG. 5, illustrated is an example schematic system block diagram of a system for facilitating local edge computing resiliency according to one or more embodiments.

Once the edge controller has determined the edge compute node 404a, 404b, 404c to utilized, the application can be sent to that edge compute node 404a, 404b, 404c, which can have its corresponding RAN 302a, 302b, 302c that can be utilized to push the application services to other UEs. It should be noted that the RANs 302a, 302b, 302c and UEs can be connected to multiple edge compute node 404a, 404b, 404c (or a central compute) sites. By moving the application out of harm's way, the application can still serve as many customers as possible that are within range to provide adequate quality of service (QoS).

The UEs can be the same UEs $102_1$, $102_2$, $102_3$ of the first responder network whos data was used to determine which edge compute nodes 404a, 404b, 404c to offload the applications. Alternatively, these applications can service other UEs that were not a part of the data curation process, thereby preventing an outage of services, to the other UEs, that is based the emergency situation.

Figure 6:
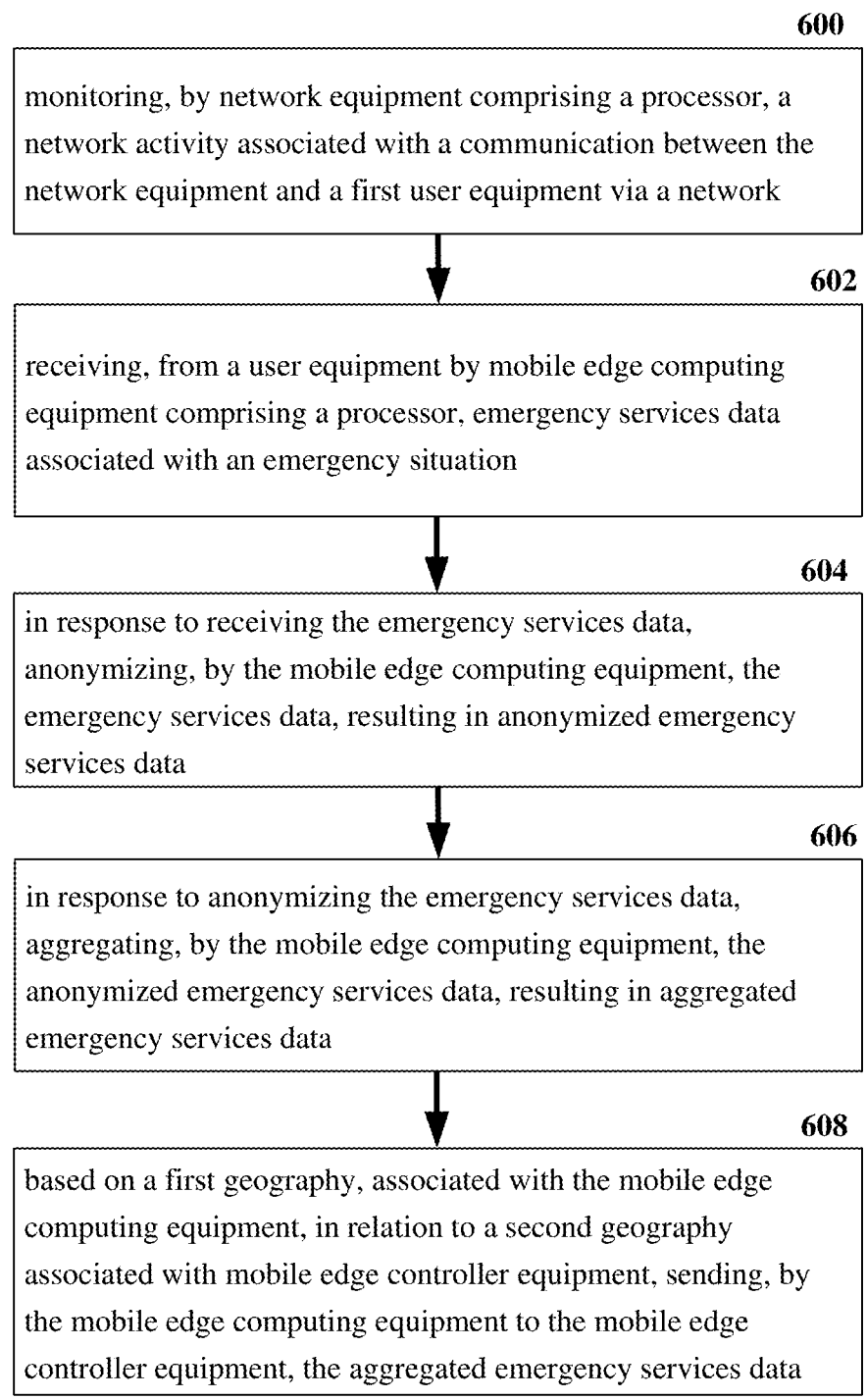
FIG. 6 illustrates an example flow diagram for a method for facilitating local edge computing resiliency according to one or more embodiments.

Referring now to FIG. 6, illustrated is an example flow diagram for a method for facilitating local edge computing resiliency according to one or more embodiments.

At element 600, the method can comprise receiving, from a user equipment by mobile edge computing equipment comprising a processor, emergency services data associated with an emergency situation. In response to receiving the emergency services data, at element 602, the method can comprise anonymizing, by the mobile edge computing equipment, the emergency services data, resulting in anonymized emergency services data. Additionally, at element 604, in response to anonymizing the emergency services data, the method can comprise aggregating, by the mobile edge computing equipment, the anonymized emergency services data, resulting in aggregated emergency services data. Furthermore, based on a first geography associated with the mobile edge computing equipment, at element 606, in relation to a second geography associated with mobile edge controller equipment, the method can comprise sending, by the mobile edge computing equipment to the mobile edge controller equipment, the aggregated emergency services data.

Figure 7:
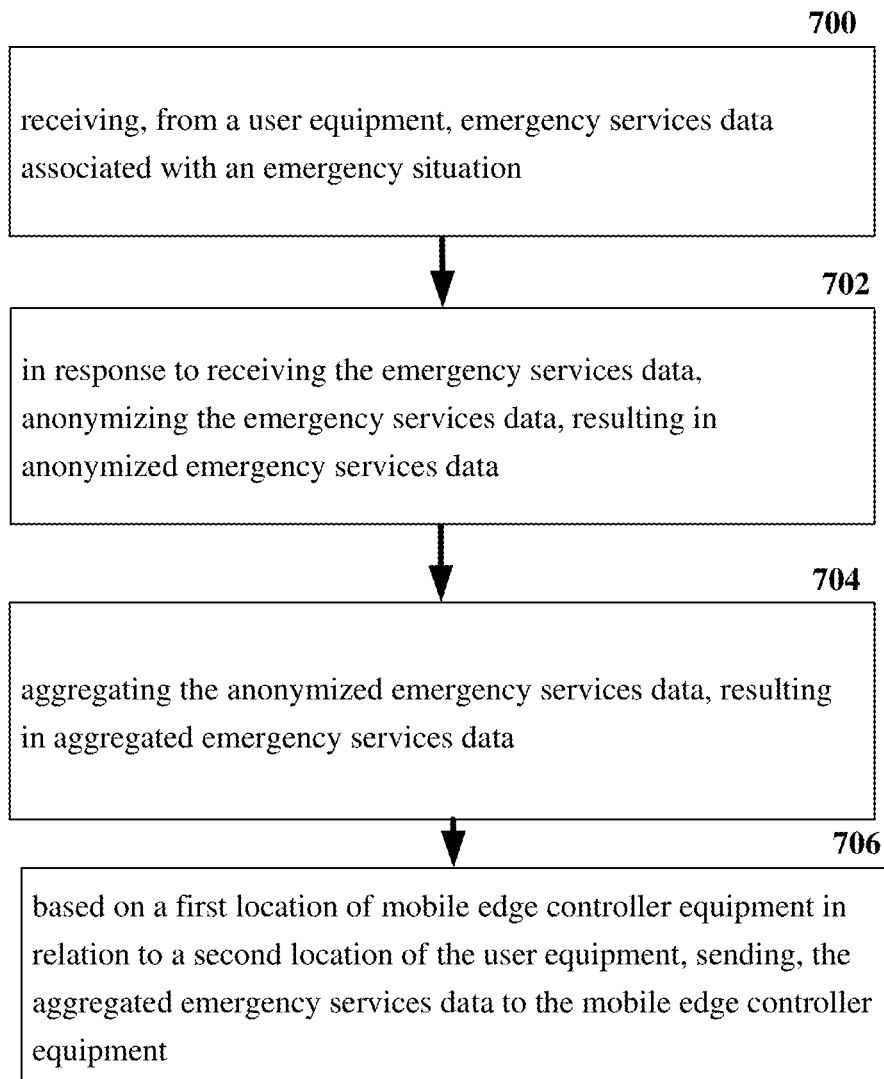
FIG. 7 illustrates an example flow diagram for a system for facilitating local edge computing resiliency according to one or more embodiments.

Referring now to FIG. 7, illustrated is an example flow diagram for a system for facilitating local edge computing resiliency according to one or more embodiments.

At element 702, the system can comprise receiving from a user equipment, emergency services data associated with an emergency situation. In response to receiving the emergency services data, at element 704, the system can comprise anonymizing the emergency services data, resulting in anonymized emergency services data. Additionally, at element 706, the system can comprise aggregating the anonymized emergency services data, resulting in aggregated emergency services data. Furthermore, at element 708, based on a first location of mobile edge controller equipment in relation to a second location of the user equipment, the system can comprise sending, the aggregated emergency services data to the mobile edge controller equipment.

Figure 8:
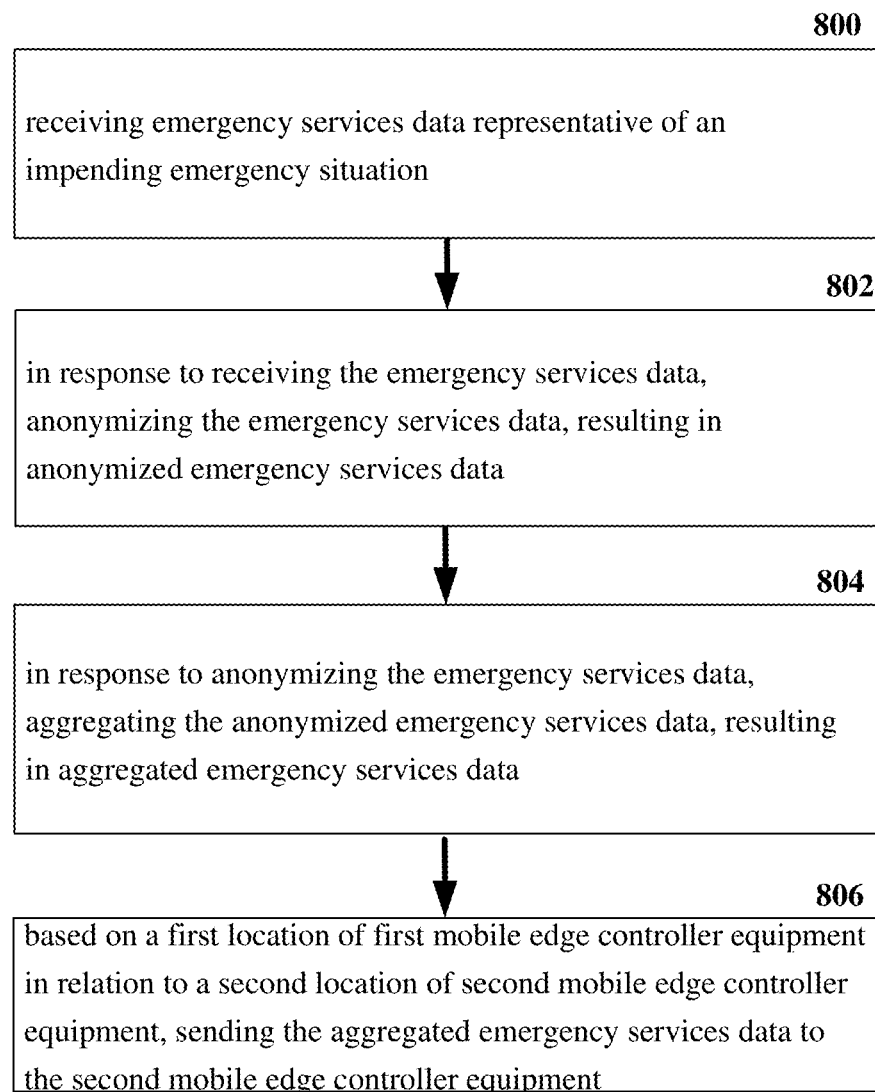
FIG. 8 illustrates an example flow diagram for a machine-readable medium for facilitating local edge computing resiliency according to one or more embodiments.

Referring now to FIG. 8, illustrated is an example flow diagram for a machine-readable medium for facilitating local edge computing resiliency according to one or more embodiments.

As illustrated, a non-transitory machine-readable medium can comprise executable instructions that, when executed by a processor, facilitate performance of operations.

The operations comprise, at element 800, receiving emergency services data representative of an impending emergency situation. At element 802, the operations can comprise anonymizing the emergency services data, resulting in anonymized emergency services data in response to receiving the emergency services data. Furthermore, at element 804, the operations can comprise aggregating the anonymized emergency services data, resulting in aggregated emergency services data, in response to anonymizing the emergency services data. Additionally, based on a first location of first mobile edge controller equipment in relation to a second location of second mobile edge controller equipment, the operations can comprise sending the aggregated emergency services data to the second mobile edge controller equipment.

Figure 9:
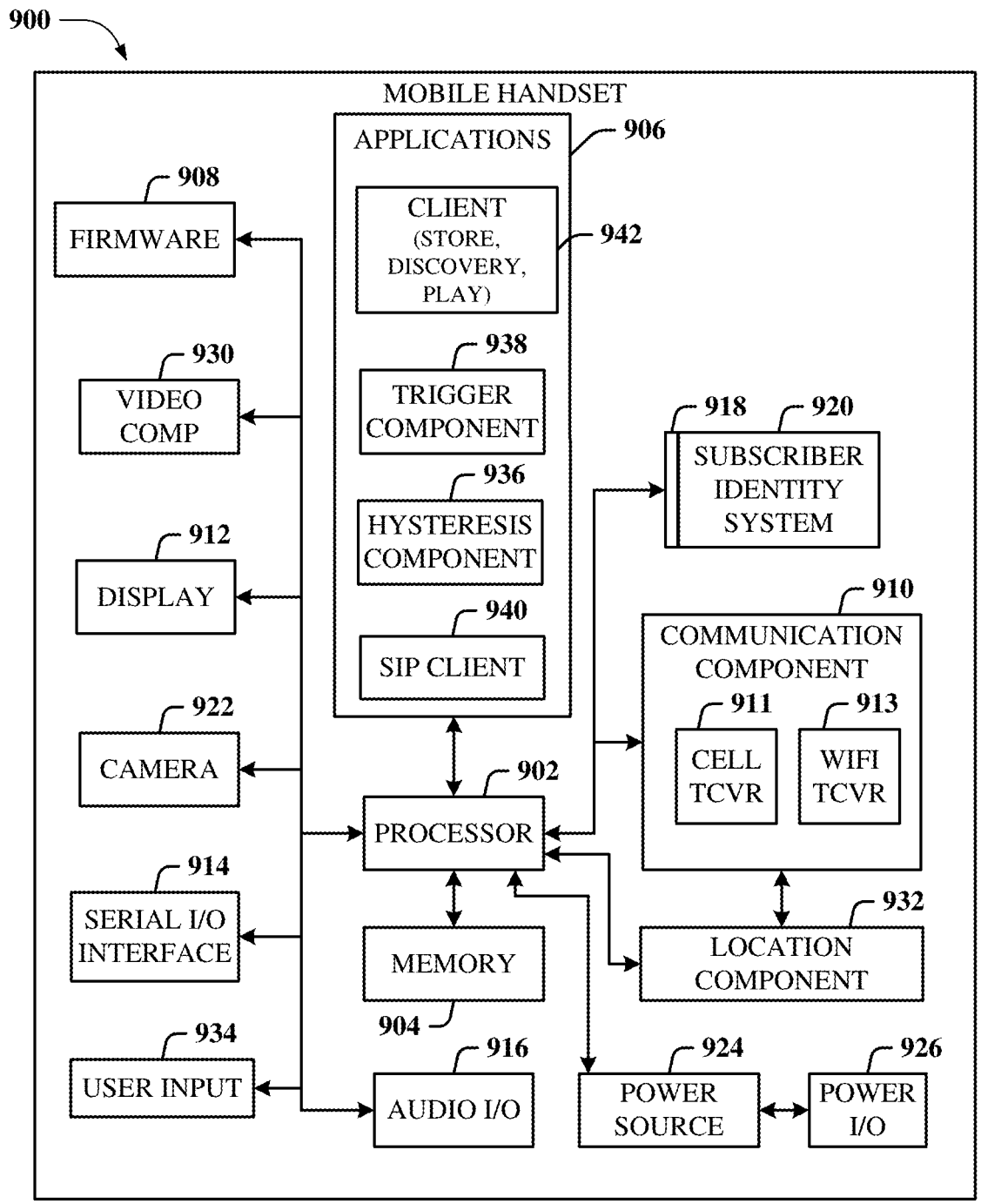
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary user equipment, such as a mobile handset 900, capable of connecting to a network in accordance with some embodiments described herein. (As one example, mobile handset 900 can be UE 102 in FIG. 1). Although a mobile handset 900 is illustrated herein, it will be understood that other mobile devices are contemplated herein and that the mobile handset 900 is merely illustrated to provide context for the embodiments of the various embodiments described herein. The following discussion is intended to provide a brief, general description of an example of a suitable environment, such as mobile handset 900, in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR) and other wireless media. Combinations of the any of the above should also be included within the scope of computer-readable media.

The mobile handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, voice over internet protocol (VoIP) networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The mobile handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an alternating current (AC) power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The mobile handset 900, as indicated above related to the communications component 910, includes an indoor network radio transceiver 913 (e.g., Wi-Fi transceiver). This function supports the indoor radio link, such as IEEE 802.11, for the mobile handset 900, e.g., a dual-mode GSM handset. The mobile handset 900 can accommodate at least satellite radio services through a handset that can combine wireless voice and digital radio chipsets into a single handheld device.

Figure 10:
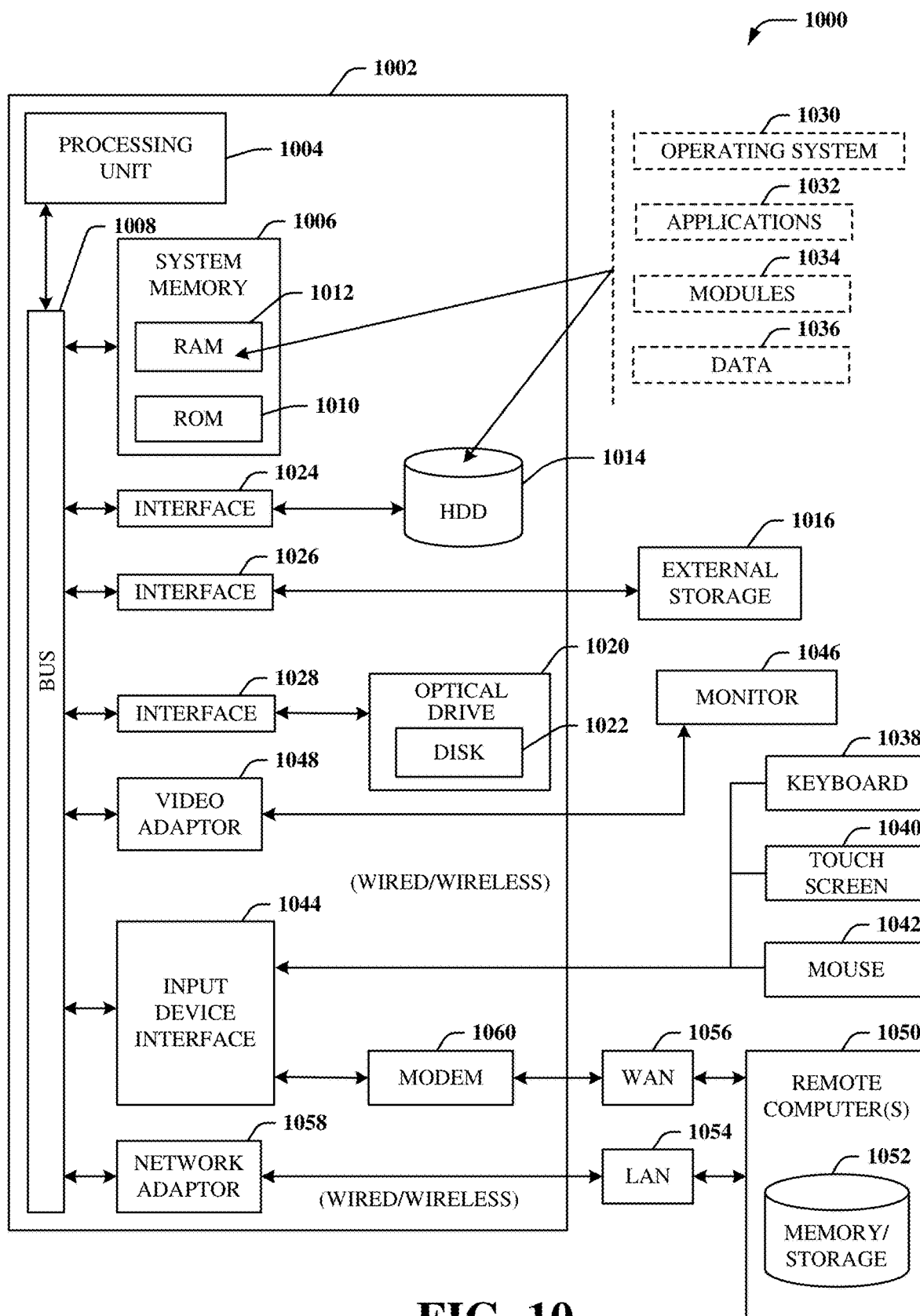
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, IR and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of USB and IEEE 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an IR remote control, an RF remote control, or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wi-Fi and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
  analyzing, by first mobile network edge computing equipment comprising a processor, aggregated emergency services data to predict a geographic area associated with an emergency situation; and
  in response to a location of the first mobile network edge computing equipment being within the geographic area, facilitating, by the first mobile network edge computing equipment, moving an emergency services application from being executed by the first mobile network edge computing equipment to being executed via second mobile network edge computing equipment, wherein the second mobile network edge computing equipment is outside the geographic area of the emergency situation, and wherein the emergency services application comprises a device control application that controls movement of a device.

2. The method of claim 1, further comprising:
  receiving, by the first mobile network edge computing equipment, from a user equipment, emergency services data associated with the emergency situation; and
  including, by the first mobile network edge computing equipment, the emergency services data in the aggregated emergency services data.

3. The method of claim 1, further comprising anonymizing, by the first mobile network edge computing equipment, emergency services data comprised in the aggregated emergency services data.

4. The method of claim 1, wherein the aggregated emergency services data comprises text data representative of text messages received from user equipment during the emergency situation.

5. The method of claim 1, further comprising:
  receiving, by the first mobile network edge computing equipment, from a user equipment, timestamped emergency services data associated with the emergency situation; and
  including, by the first mobile network edge computing equipment, the timestamped emergency services data in the aggregated emergency services data.

6. The method of claim 1, further comprising:
  generating, by the first mobile network edge computing equipment, priority data representative of a priority associated with a type of the emergency situation.

7. The method of claim 6, wherein facilitating the moving of the emergency services application from being executed by the first mobile network edge computing equipment to being executed via the second mobile network edge computing equipment is based on the priority data.

8. The method of claim 1, wherein facilitating the moving the emergency services application from being executed by the first mobile network edge computing equipment to being executed via the second mobile network edge computing equipment is based on an aggregation threshold of the aggregated emergency services data being determined to have been satisfied.

9. The method of claim 1, wherein the aggregated emergency services data comprises call data representative of user equipment calls during the emergency situation.

10. A system, comprising:
a processor; and
a memory that stores executable instructions that, when executed by the processor, facilitate performance of operations, comprising:
analyzing aggregated emergency services data to predict a geographic area that is going to correspond to an emergency situation;
in response to a location of a first edge computing equipment being determined to be within the geographic area, moving the aggregated emergency services data from being stored via the first edge computing equipment to being stored via a second edge computing equipment, wherein the second edge computing equipment is outside the geographic area of the emergency situation; and
receiving emergency services data from a user equipment and including the emergency services data in the aggregated emergency services data, wherein a location of the first edge computing equipment is a first location, and wherein a second location of the second edge computing equipment is determined to be closer to the user equipment than a third location of third edge computing equipment.

11. The system of claim 10, wherein the operations further comprise anonymizing the aggregated emergency services data.

12. The system of claim 11, wherein anonymizing the aggregated emergency services data comprises at least one of removing identification data associated with an identification of a user equipment or removing personal data representative of a user identity.

13. The system of claim 10, wherein the operations further comprise:
moving an emergency services application from being executed by the first edge computing equipment to being executed via the second edge computing equipment.

14. The system of claim 13, wherein the emergency services application comprises a device control application that controls movement of a device.

15. The system of claim 13, wherein the emergency services data received from the user equipment comprises call data representative of a call placed by the user equipment.

16. The system of claim 10, wherein moving the aggregated emergency services data is based on a severity level of the emergency situation.

17. A non-transitory machine-readable medium, comprising executable instructions that, when executed by a processor, facilitate performance of operations, comprising:
analyzing aggregated emergency services data to predict a geographic area applicable to an emergency; and
based on a first location of a first network edge controller equipment being determined to be within the geographic area of the emergency, instructing the first network edge controller equipment to send the aggregated emergency services data to a second network edge controller equipment, wherein the second network edge controller equipment is at a second location that is outside the geographic area of the emergency, wherein instructing the first network edge controller equipment to send the aggregated emergency services data is based on a threshold being determined to have been satisfied.

18. The non-transitory machine-readable medium of claim 17, wherein the aggregated emergency services data comprises anonymized emergency services data.

19. The non-transitory machine-readable medium of claim 17, wherein the emergency comprises a hurricane, a tornado, or a fire.

20. The non-transitory machine-readable medium of claim 17, wherein the aggregated emergency services data comprises text data representative of text messages received from user equipment during the emergency.

* * * * *